March 7, 1933.                W. F. LOVE                1,900,827
                                DIBBLE
                         Filed Jan. 14, 1932            2 Sheets-Sheet 1

Inventor

W. F. Love

By Clarence A. O'Brien
Attorney

March 7, 1933. W. F. LOVE 1,900,827
DIBBLE
Filed Jan. 14, 1932 2 Sheets-Sheet 2
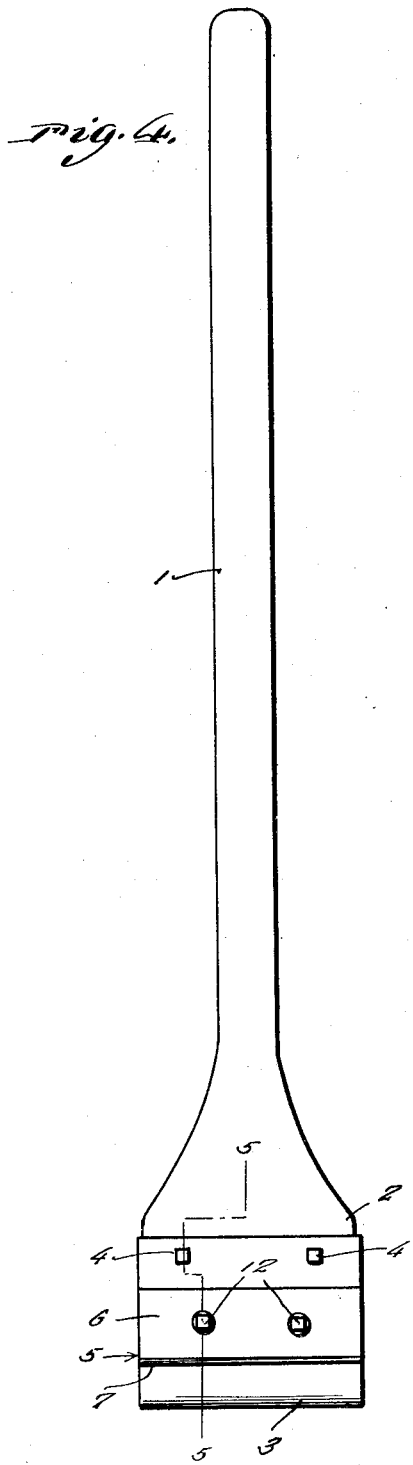
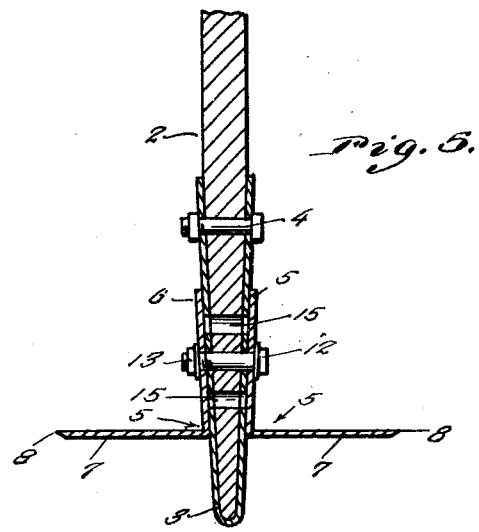
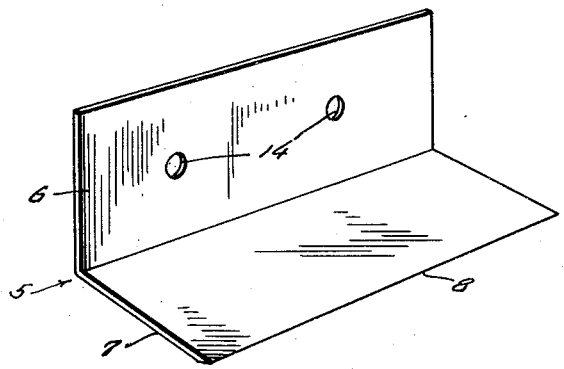
Inventor
W. F. Love
By Clarence A. O'Brien
Attorney Patented Mar. 7, 1933

1,900,827

UNITED STATES PATENT OFFICE

WILLIAM F. LOVE, OF TRENTON, FLORIDA, ASSIGNOR TO JOSIE LOVE, OF TRENTON, FLORIDA

DIBBLE

Application filed January 14, 1932. Serial No. 586,614.

The present invention relates to new and useful improvements in dibbles and has for one of its important objects to provide, in a manner as hereinafter set forth, a device of this character embodying gage plates which are shiftably mounted thereon in a manner to be expeditiously adjusted for regulating the depth of the hole or depression made by the dibble.

Another important object of the invention is to provide novel means for rigidly securing the gages in adjusted position, said gages further being adapted to function as hoe blades when desired.

Other objects of the invention are to provide a dibble which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 4 is a view in side elevation of another form of the invention.

Figure 5 is a vertical sectional view, taken substantially on the line 5—5 of Figure 4.

Figure 6 is a detail view in perspective of one of the gages constituting a part of the modified form of the invention.

Figure 1:
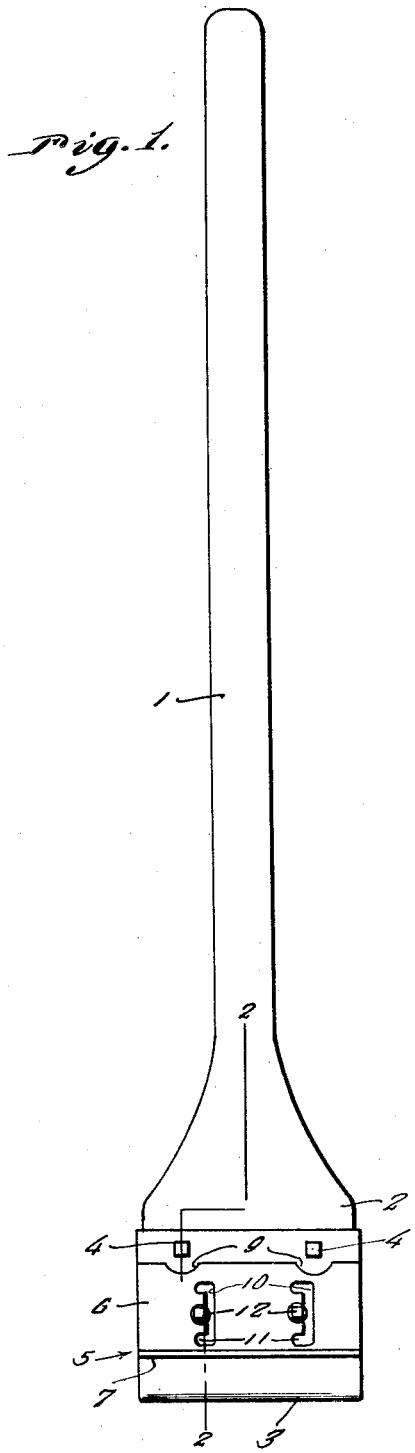
Figure 1 is a view in side elevation of an embodiment of the invention.
Figure 2:
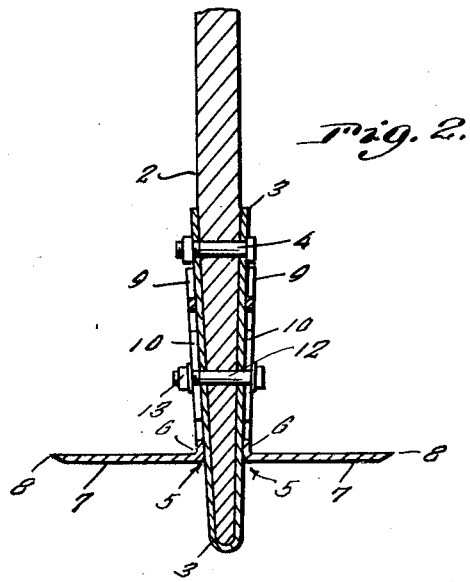
Figure 2 is a sectional view, taken substantially on the line 2—2 of Figure 1.
Figure 3:
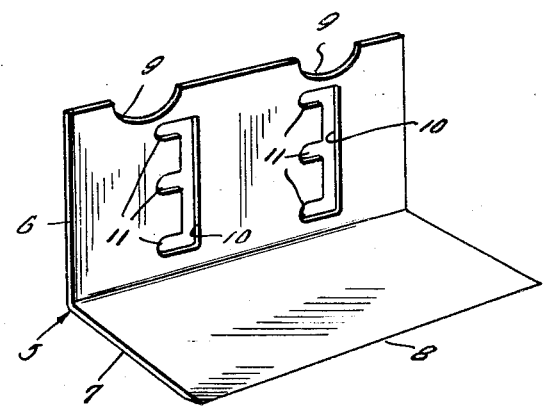
Figure 3 is a detail view in perspective of one of the adjustable gages.

Referring now to the drawings in detail, it will be seen that the reference numeral 1 designates an elongated handle of suitable material, preferably wood, the lower end of which merges with a widened, substantially wedge-shaped head 2 which is enclosed in a casing 3 of suitable metal. The casing 3 conforms in shape substantially to the shape of the head 2. The head 2 and casing 3 constitute a blade adapted to be driven into previously prepared ground in a manner to form a pocket for the reception of seed. The casing 3 is secured in position on the head 2 through the medium of the nut equipped transversely extending bolts 4.

Angular gages designated generally by the reference numeral 5 are detachably and adjustably mounted on the sides of the casing 3. The gages 5 include the legs 6 which abut the casing 3 and the legs 7 which project outward horizontally from the casing and which are provided with sharpened outer edges 8.

The upper edges of the legs 6 of the gages 5 are provided with cut-outs 9 adjacent the casing securing bolts 4. The legs 6 of the gages 5 are further provided with the pairs of vertical slots 10 from one side of which the notches or horizontal recesses 11 extend, each slot 10 being provided with a series of said vertically spaced notches or recesses. The slots 10 of the legs 6 are aligned for the passage of the bolts 12 which extend through the head 2 and the casing 3. Nuts and washers 13 are provided on one end of the bolts 12.

When it is desired to adjust the gages 5, the nuts 13 are loosened to permit shifting of the gages to engage said bolts selectively in the notches or recesses 11 of the slots 10, after which the nuts 13 are tightened and the gages are thus secured in adjusted position.

In the slightly modified form of the invention illustrated in Figures 4, 5 and 6 of the drawings, the upstanding legs 6 of the gages 5 are provided with the aligned openings 14 for the passage of the bolts 12. The head 2 and the casing 3 are provided with vertical series of openings 15 in which the bolts 12 are selectively insertable after the gages have been adjusted to bring the openings 14 into registry with the desired openings 15. The nuts 13 are then threaded on the bolts 12 and tightened.

As will be obvious, the blade constituted by the head 2 and the casing 3 is driven into the previously prepared ground in a manner to provide an elongated pocket or depression for the reception of the seed or plant, the downward movement of the blade being arrested by the horizontally extending portions of the gages. When it is desired to make a comparatively deep depression in the ground, the gages 5 are, of course, adjusted upward on the casing 3 and when a comparatively shallow depression is desired, the gages are adjusted downward. In arresting downward movement of the dibble, the gages engage and pack the surface of the ground around the depression which has been formed. Further, as hereinbefore explained, the sharpened edges 8 permit the dibble to be used in the manner of a hoe whenever desired.

It is believed that the many advantages of a dibble constructed in accordance with the present invention will be readily understood, and although the preferred embodiments of the invention are as illustrated and described, it is to be understood that changes in the details of construction and in the combination and arrangement of parts may be resorted to which will fall within the scope of the invention as claimed.

What is claimed is:—

1. A dibble comprising an elongated handle, a comparatively wide, substantially wedge-shaped head on one end of the handle, a substantially wedge-shaped metallic casing mounted on the head and enclosing said head bolts passing through the head and through the upper portion of the sides of the casing for connecting the casing to the head, said bolts being arranged in a transverse plane, angular gages adjustably mounted on opposite sides of the casing, said gages comprising a vertical leg abutting the casing and a horizontal leg extending outward from the casing, bolts extending through the vertical legs of the gages and through the casing and the head, and nuts threaded on the bolts for drawing the gages toward each other against the casing the last-mentioned bolts being arranged in a transverse plane and the upper portion of the vertical limbs of the gages having notches therein in vertical alinement with the first-mentioned bolts.

2. A dibble comprising an elongated handle, a comparatively wide, substantially wedge-shaped head on one end of the handle, a substantially wedge-shaped metallic casing mounted on the head and enclosing the same, angular gages adjustably mounted on opposite sides of the casing and including vertical legs abutting the casing and horizontal legs projecting outward from the casing, the vertical legs having aligned, vertical slots therein and further having series of vertically spaced notches extending horizontally from the slots, and nut equipped bolts extending through the casing and head and through the slots for selective engagement in the notches for securing the gages in adjusted position on the casing.

In testimony whereof I affix my signature.
WILLIAM F. LOVE.